No. 673,723. Patented May 7, 1901.
J. D. MURRAY & C. A. PENNY.
MOWER.
(Application filed Nov. 14, 1900.)
(No Model.)
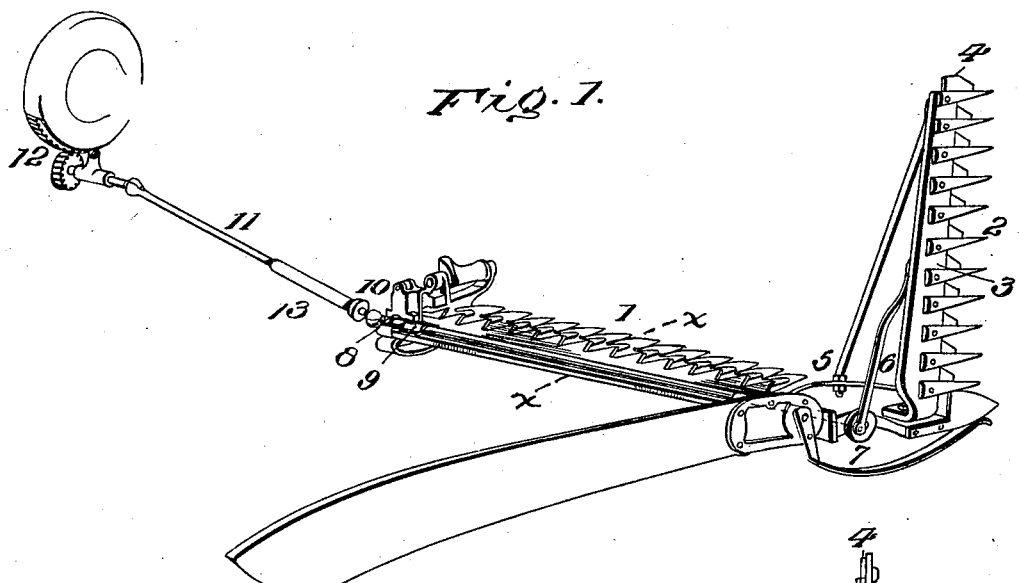
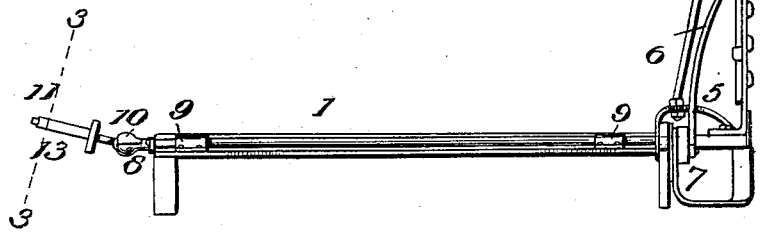
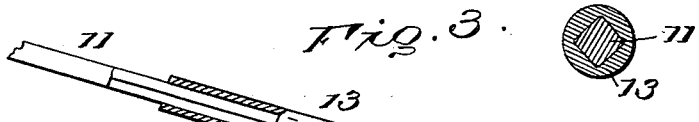
Inventors:
John D. Murray
Charlie A Penny.

UNITED STATES PATENT OFFICE.

JOHN D. MURRAY, OF RIFLE, AND CHARLIE A. PENNY, OF RAVEN, COLORADO.

MOWER.

SPECIFICATION forming part of Letters Patent No. 673,723, dated May 7, 1901.

Application filed November 14, 1900. Serial No. 36,512. (No model.)

*To all whom it may concern:*

Be it known that we, JOHN D. MURRAY, of Rifle, and CHARLIE A. PENNY, of Raven, in the county of Garfield and State of Colorado, have invented certain new and useful Improvements in Mowers; and we do hereby declare the following to be a full, clear, and exact description of the invention, such as will enable others skilled in the art to which it appertains to make and use the same.

This invention has reference to that type of mowers employing a supplemental sickle working at practically right angles to the main sickle.

The primary object of our improvement is to operate the supplemental sickle by means driven directly by the machinery of the mower and also to so locate the operating means that the same will serve to throw the alfalfa or other grain to the rear of the main sickle.

The invention will be hereinafter fully set forth, and particularly pointed out in the claims.

In the accompanying drawings, Figure 1 shows the general outline of portions of a mower equipped with our improvement. Fig. 2 is a rear elevation. Fig. 3 is a cross-sectional view on line 3 3, Fig. 2. Fig. 4 is an enlarged detail. Fig. 5 is a cross-section on line *x x*, Fig. 1.

Referring to the drawings, 1 designates the main horizontally-positioned sickle of a mower provided with the ordinary fingers and cutter, which latter may be operated after any preferred manner, but as it forms no part of our invention need not be further described. On the outer end of this main sickle is a supplemental sickle 2, disposed and designed to cut at substantially right angles to the main sickle. It is shown as being composed of a finger-bar 3 and cutter 4, said bar being held in its proper position by a brace-rod secured to the shoe or runner 5. The knife 4 is connected by a pitman 6 to a wheel 7 on the end of a shaft 8, having its bearings in boxes 9 on the main sickle-bar. This shaft is shown as being sectional, its approximately horizontal part being articulated by a ball-and-socket connection 10 to the complementary part 11, which in turn is suitably connected to any wheel, as 12, directly operated by the mower mechanism. (Not shown.) This part 11 has a sliding sleeve 13 to allow of the horizontal adjustment thereof in the raising and lowering of the main sickle. In the rotation of shaft 8 its upper surface moves toward the rear. In consequence grain falling upon the main sickle is thrown backward.

In the use of our improvement the upright sickle is positively operated, and the location of the operating-shaft on the main sickle aids very materially in preventing the cut grain from accumulating on the main sickle.

We claim as our invention—

1. A mower having a main sickle, and a supplemental sickle at substantially right angles to the main sickle, and a revoluble shaft carried by the latter for directly operating said supplemental sickle independently of the reciprocation of the main sickle, substantially as set forth.

2. The combination with the main sickle, of the supplemental sickle at one end thereof, a shaft mounted on the main sickle and operatively connected to said supplemental sickle, and means for operating said shaft so that its upper surface moves in the direction toward the rear of the main sickle, as set forth.

3. The combination with the main sickle, of the supplemental sickle at one end thereof, a shaft mounted on the main sickle, a wheel on one end of said shaft, a pitman connecting said supplemental sickle to said wheel, operating mechanism, and means connecting the other end of said shaft to said mechanism, substantially as set forth.

4. The combination with the main sickle, of the supplemental sickle at one end thereof, a shaft mounted on the main sickle, a wheel on one end of said shaft, a pitman connecting said supplemental sickle to said wheel, operating mechanism, and a connection between said shaft and operating mechanism, said connection having a sliding sleeve to allow of its longitudinal adjustment, substantially as set forth.

In testimony whereof we have signed this specification in the presence of two subscribing witnesses.

JOHN D. MURRAY.
CHARLIE A. PENNY.

Witnesses to signature of John D. Murray:
THEO. HATOPP,
J. A. MACRAE.

Witnesses to signature of Charlie A. Penny:
J. H. THURSTON,
GEO. MITCHELL.